Figure 1:
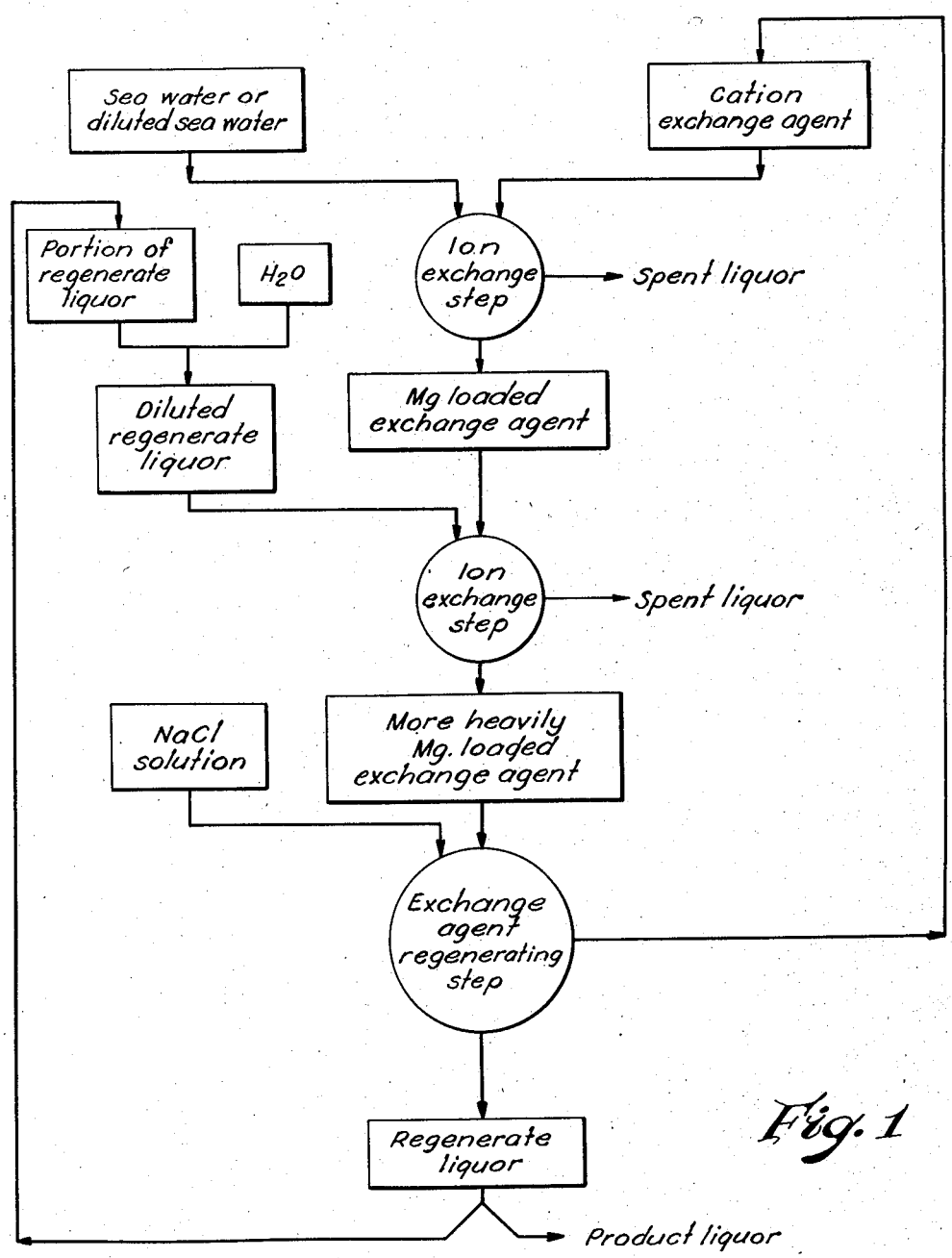

INVENTORS.
William F. McIlhenny
James A. Clarke
Albert B. Baker
William C. Bauman
BY Griswold & Burdick
ATTORNEYS

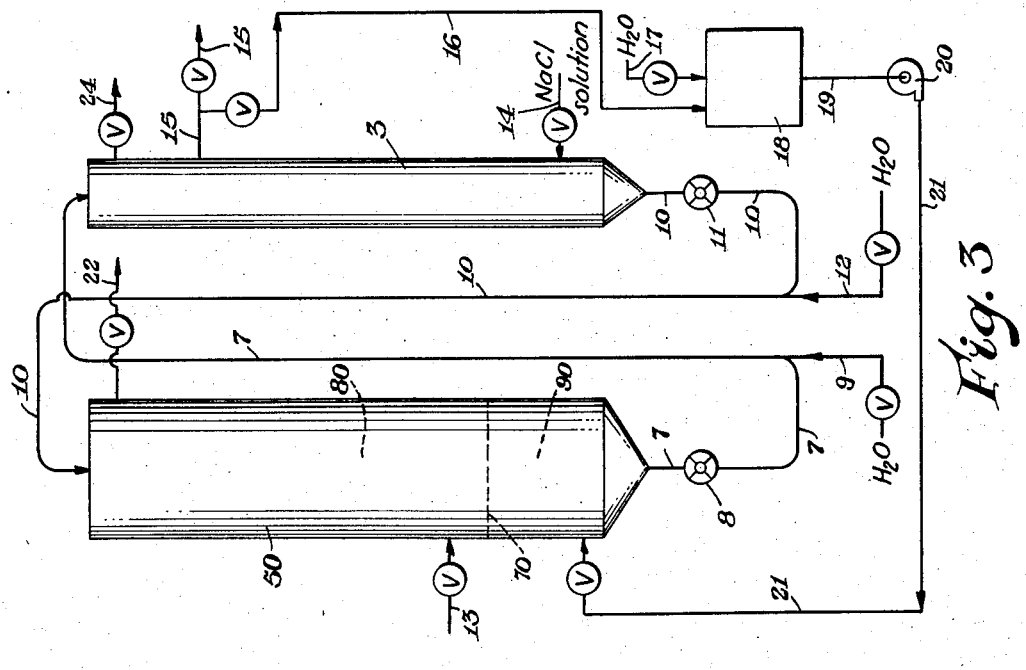
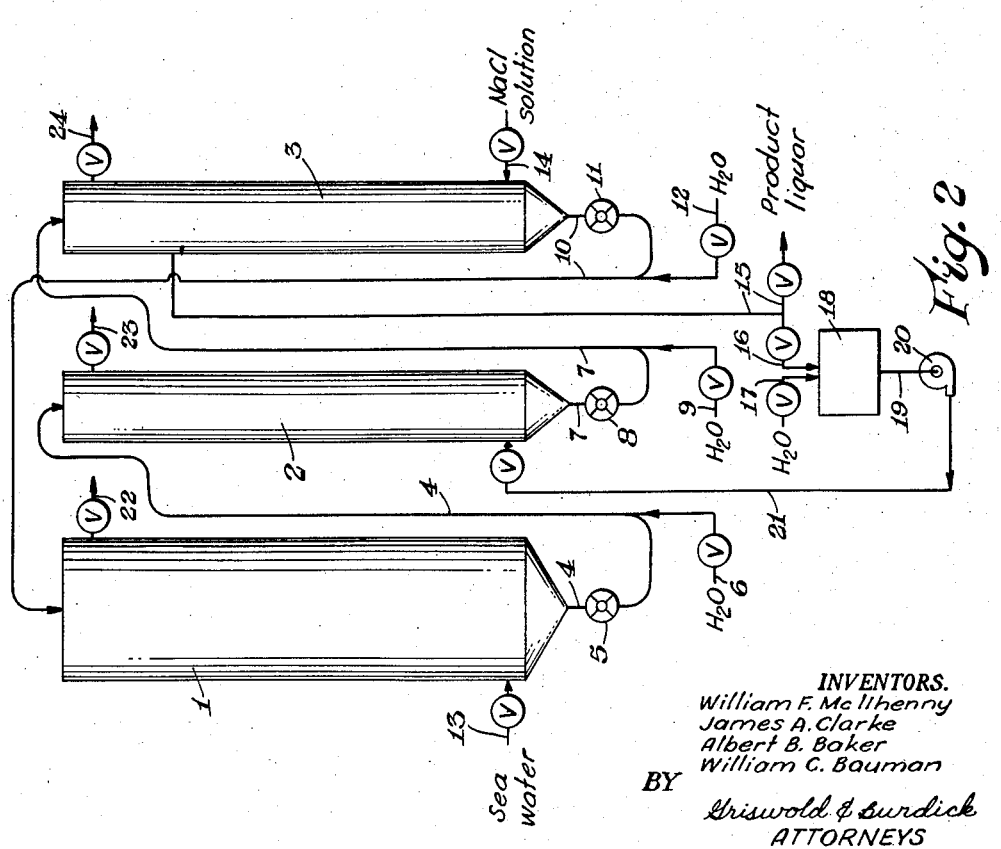

2,897,051
TREATMENT OF SOLUTIONS COMPRISING SIMILARLY CHARGED MONOVALENT AND POLYVALENT IONS TO CONCENTRATE THE POLYVALENT IONS

William F. McIlhenny and Albert B. Baker, Freeport, James A. Clarke, Lake Jackson, Tex., and William C. Bauman, Midland, Mich., assignors to The Dow Chemical Company, Midland, Mich., a corporation of Delaware Application May 2, 1955, Serial No. 505,431
9 Claims. (Cl. 23—91)

This invention concerns an improved ion exchange method for treating solutions of ionizable compounds, which solutions contain monovalent and polyvalent ions having the same kind of electrical charge, to concentrate the polyvalent ions. It pertains especially to the treatment of dilute aqueous solutions of inorganic compounds comprising monovalent and polyvalent cations to produce an aqueous solution containing a higher concentration of the polyvalent cations than in the starting solution. The invention is concerned particularly with the treatment of sea water, or other natural brines containing a multiplicity of dissolved ionizable inorganic salts, including one or more magnesium salts and one or more alkali metal salts, to produce an aqueous salt solution which is richer than the starting solution in magnesium ions.

Certain ion exchange procedures for concentrating polyvalent ions, especially magnesium ions, present in dilute aqueous solutions of the same and monovalent ions are disclosed in U.S. Patents 2,387,898 and 2,671,714. According to both of these patents a dilute starting solution, such as sea water, containing salts of magnesium and of alkali metals is contacted with a cation exchange agent which is effective in chemically absorbing cations, especially the magnesium ions, from the solution. The cation exchange agent is then contacted with a fairly concentrated solution of a salt such as sodium chloride, whereby an effluent regenerate liquor, containing a considerably higher concentration of magnesium ions than was present in the starting solution, is obtained. Patent No. 2,387,898 passes the starting solution, and subsequently the concentrated sodium chloride solution, through a bed of the ion exchange agent and collects the effluent solution as successive fractions, certain of which are richer in magnesium ions than is the starting solution. The patent teaches that after fully treating a cation exchange agent with sea water, the proportion of magnesium ions chemically absorbed by the agent can be increased by a further treatment of the agent with sea water which has been diluted with fresh water and that this results in a corresponding increase in the maximum concentration of magnesium ions in the regenerate liquor which is formed by subsequent treatment of the agent with the concentrated sodium chloride solution. Patent No. 2,671,714 circulates the ion exchange resin through a pair of columns while passing a starting solution, such as sea water, and a regenerating solution, e.g. a concentrated sodium chloride solution, through the respective columns counter to the movement of the ion exchange agent. A regenerate product liquor which is richer in the desired ions, e.g. magnesium ions, than the starting solution flows from the column into which the regenerating solution is fed.

Procedures similar to those of the above patents can be applied generally in treating dilute starting solutions containing monovalent and polyvalent ions having the same kind of electrical charges to produce regenerate liquors containing a higher concentration of the polyvalent ions than in the starting solution. When polyvalent cations in the starting solution are to be concentrated, a cation exchange agent is employed and the desired absorbed polyvalent cations are displaced from the agent with cations of a different kind, preferably by treatment of the cation exchange agent with a regenerating solution rich in monovalent cations. Similarly, when polyvalent anions are to be concentrated, an anion exchange agent is employed and the desired absorbed polyvalent anions are displaced from the agent by anions of a different kind, e.g. by treatment with a regeneration solution rich in monovalent anions. The portion of regenerate product liquor thus obtained which is enriched in the desired polyvalent ions contains a higher atomic ratio of the polyvalent ions to monovalent ions having the same kind of electrical charge than was present in the starting solution.

It has now been found that by diluting a portion of the regenerate liquor from any such a procedure with water, or with a portion of the starting solution, e.g. sea water, or with a mixture of water and the starting solution in any desired proportions, and contacting the diluted portion of the regenerate liquor with the ion exchange agent that is loaded with ions absorbed from the starting solution, the proportion of the desired polyvalent ions relative to the monovalent ions chemically absorbed by the ion exchange agent can be increased. This results in a corresponding increase in the maximum concentration of the polyvalent ions in that portion of the regenerate liquor subsequently produced and withdrawn as product. For instance, a portion of the regenerate liquor enriched in magnesium ions obtained from sea water by the procedure of either of the above-mentioned patents can be diluted with fresh water, or with sea water, or with any mixture thereof, and be contacted with a cation exchange agent that has absorbed its capacity of magnesium ions from sea water to cause chemical absorption of a further amount of magnesium ions by the agent. This results in a corresponding increase in the maximum concentration of magnesium ions in the regenerate liquor produced by subsequently treating the agent with an aqueous sodium chloride solution of a given concentration. Fresh water is preferably employed as the diluent for the above-mentioned portion of the regenerate liquor.

When applying the method of the invention in concentrating the magnesium ions of sea water, or of other natural brines, it has been found that the concentration of magnesium ions chemically absorbed, e.g. consecutively from the undiluted or diluted starting solution and from a diluted portion of the regenerate liquor, can be increased further by removing calcium ions from the sea water prior to contacting the latter with the cation exchange resin. The feature of removing calcium ions from sea water prior to contacting it with a cation exchange agent is disclosed in a copending application of McIlhenny, Baker and Clarke, Serial No. 383,392, filed September 30, 1953, now Patent No. 2,772,143, issued November 27, 1956. This application does not claim said feature, per se, but only in combination with other steps of the present process.

Fig. 1 of the accompanying drawing is flow sheet showing a sequence of steps for practice of the invention in concentrating the magnesium ions of sea water. The steps shown may be practiced, in the order indicated, either batchwise or in a continuous manner. In batchwise practice, the several liquors named may be passed, in the order indicated, through a bed of the cation exchange agent. The portion of the regenerate liquor which is diluted with water and recycled, e.g. as a reflux liquor, contains a higher atomic ratio of magnesium ions to sodium ions than the sea water, or the sea water diluted with fresh water, which is fed to the process as a whole. A further portion of the regenerate liquor, containing magnesium ions in higher concentration than in the sea water, is withdrawn as product. A single bed of cation exchange agent can be used repeatedly in the process.

The steps indicated in Fig. 1 can be supplemented by other desirable, but non-essential, steps not shown. For instance, calcium ions may be removed from the sea water, e.g. by treating the latter with an alkali carbonate such as sodium or potassium carbonate to form and precipitate calcium carbonate, prior to feeding the sea water, as such or diluted with fresh water, to the first of the ion exchange steps indicated in Fig. 1. This results in an increase in the proportion of magnesium ions chemically absorbed by the cation exchange resin and in a corresponding increase in the maximum concentration of magnesium ions in the regenerate liquor. Dilution of the last added portions of the sea water with a considerable amount, e.g. an equal volume or more, of fresh water causes similar results. After being fully loaded with chemically absorbed magnesium ions, the cation exchange resin may be washed with water. It may also be washed with water after being regenerated and prior to being re-employed in the process. Such water-washing operations are usually desirable, but are not required.

Fig. 2 of the drawing illustrates, diagrammatically, an arrangement of apparatus for practice of the invention in a continuous manner. In Fig. 2, the numeral 1 represents a column which is provided near its bottom with a valved inlet 13 for sea water. Column 1 is provided near its top with valved outlet 22. A line 4, which is provided with star valve 5, or a similar device and with a valved connecting line 6 for a jet of water or other liquid, e.g. sea water, to aid in sweeping the ion exchange agent upward through line 4, leads from the bottom section of column 1 to an upper section of a column 2. The latter is provided near the top with a valved outlet 23. A line 7, which is provided with a star valve 8, or a similar device, and with a valved connecting line 9 for a jet of water or sea water to aid in transferring ion exchange material, leads from the bottom of column 2 to an upper section of a column 3. The latter is provided near its bottom with a valved inlet 14 for a fairly concentrated regenerating solution, e.g. a sodium chloride solution, and, near its top, with a valved outlet 24. It may also be provided, at the upper section thereof, with devices, not shown, for detecting the upper level of a fairly compact bed of ion exchange resin in the column and for detecting the interface between the stream of liquid used to convey ion exchange material into the upper section of column 3, and the more dense brine in contact therewith, i.e. in lower portions of the column. Devices suitable for these purposes are described in U.S. Patent No. 2,671,714. A line 10, which is provided with a star valve 11, or a similar device for withdrawing pockets of ion exchange agent and accompanying liquid from the column while preventing free flow of liquid through the device, and which line 10 is also provided with a valved connecting line 12 for supplying a sufficient flow of water to carry the ion exchange material upward through line 10, leads from the bottom of column 3 to an upper section of column 1. A valved outlet line 15 for product liquor leads from column 3 at a point below the outlet 24 in an upper section of the column. A valved line 16 which branches from line 15 leads to a tank 18. The latter is provided with a valved inlet line 17 for water or other aqueous liquid, e.g. sea water, suitable as a diluent for the regenerant liquor which is delivered to the tank through line 16. A line 19 leads from a lower section of tank 18 to a pump 20. A valved line 21 leads from pump 20 to a lower section of column 2.

Fig. 3 shows, in schematic manner, another arrangement of apparatus suitable for use in practice of the invention. The apparatus arrangement shown in Fig. 3 is a modification of that illustrated by Fig. 2. In both of these figures of the drawing, similar parts are similarly numbered. In Fig. 3, the single column 50 amounts, in effect, to an end-to-end combination of the two columns 1 and 2 of Fig. 2 and performs the functions of said two columns. In Fig. 3, the column 50 may advantageously be provided with a horizontal perforated plate 70, as indicated, to divide the single column 50 into an upper chamber 80, corresponding in function to column 1 of Fig. 2, and a lower chamber 90, corresponding in function to column 2 of Fig. 2, but the perforated plate 70 is not required and can be omitted. Plate 70, when employed, reduces the tendency for the liquids in chambers 80 and 90 of column 50 to become mixed. The perforations in plate 50 should be large enough to permit passage of the ion exchange resin granules therethrough.

For purpose of clarity, the invention will be described as applied in concentrating the magnesium ions of sea water. Dilute aqueous solutions of other polyvalent cations or anions together with corresponding monovalent ions can similarly be treated as hereinafter described, to concentrate the polyvalent ions.

Sea water is a dilute aqueous solution of many salts and varies somewhat in composition from one place to another. The sea water employed herein contains about 2.6 weight percent of sodium chloride, about 0.5 percent of magnesium chloride, between 0.1 and 0.2 percent of calcium chloride and small amounts of various other salts. It can be used directly as a starting material in the method of the invention or it may be diluted with fresh water and/or be pretreated to remove calcium ions therefrom. Each such pretreatment of the sea water is advantageous in that it results in an increase in the proportion by weight of magnesium ions that can be absorbed from the sea water by a given amount of a cation exchange agent and in a corresponding increase in maximum concentration of magnesium ions in the regenerate liquor obtained by subsequent treatment of the ion exchange agent with an aqueous sodium chloride solution of a given concentration. Dilution of the sea water with fresh water is advantageous in the respect just stated, but increases the volume of starting liquor that must be contacted with a given quantity of a cation exchange agent in order to fully load the agent with chemically absorbed magnesium ions. In order to avoid use of an excessively large volume of diluted sea water, the cation exchange agent may advantageously first be treated with undiluted sea water to absorb magnesium ions therefrom and then be treated with the diluted sea water to cause a further absorption of magnesium on said agent. The volume of diluted sea water required for loading the cation exchange agent as fully as possible with magnesium ions may thereby be limited. The diluted sea water usually contains one or more volumes of fresh water per volume of sea water, but it may contain any desired proportion of fresh water, e.g. from 0.5 to 10 or more volumes of fresh water per volume of sea water.

The sea water, whether diluted with fresh water or not, can be treated to remove calcium ions therefrom. This may be accomplished by adding sufficient alkali carbonate, e.g. sodium carbonate, to react with the calcium compounds in the sea water and convert them to calcium carbonate and sufficient alkali hydroxide, e.g. sodium hydroxide to render the liquor slightly alkaline, e.g. of a pH value of from 8.5 to 9.5. A small amount of preformed finely divided calcium carbonate may be added as seen and the mixture be stirred to facilitate precipitation of the calcium carbonate thus formed. During these operations, magnesium hydroxide sometimes initially precipitates, but redissolves during stirring of the mixture to leave a precipitate of the calcium carbonate. The latter may be removed by filtration or by decanting.

Although each of the above-mentioned pretreatments of the sea water is advantageous, and both are often employed, such pretreatments are not required. The method of the invention is highly effective in concentrating the magnesium ions of sea water regardless of whether the latter has been diluted with fresh water or has been treated to remove calcium ions therefrom.

Any cation exchange agent can be employed in the process as applied in concentrating the magnesium ions of sea water or in treating dilute aqueous solutions of other polyvalent cations and monovalent cations to concentrate the polyvalent cations. Examples of suitable cation exchange agents are zeolite, i.e. sodium aluminum silicate, sulfonated coal, insoluble carboxylated resins such as the alkali insoluble copolymers of maleic acid, styrene and divinylbenzene, and alkali-insoluble sulfonated resins such as the nuclear sulfonated phenol-formaldehyde resins or the nuclear sulfonated copolymers of a major amount of one or more monovinyl aromatic hydrocarbons such as styrene and ethylvinylbenzene and a minor amount of divinylbenzene. The sulfonated resins are preferably employed.

The cation exchange agent is preferably in the form of a sodium salt thereof when applied to absorb magnesium ions from sea water, but it may be in its acidic form, or in the form of any ionizable salt thereof other than its magnesium salt, e.g. in the form of its ammonium salt, or its potassium salt, or in a form rich in alkali metal ions but containing a minor proportion of magnesium ions. In any such instance, the agent chemically absorbs cations from the sea water and is thereby brought to a condition in which it contains a mixture of chemically absorbed magnesium ions and alkali metal, e.g. sodium ions. Sea water, as such or in a form diluted with fresh water and/or depleted of calcium ions, may be fed to a water-immersed bed of a cation exchange agent, preferably in its sodium salt form, in a manner such as to cause a flow of liquid through and from the bed. The feed is preferably continued until the concentration of magnesium ions in the liquor flowing from the bed increases to approach, or approximate, that in the feed liquor. The feed of sea water may then be interrupted and a fairly concentrated aqueous sodium chloride solution, e.g. of 10 weight percent concentration or higher, be fed to the bed to displace liquid through and from the bed. Magnesium ions in the bed are thereby replaced by sodium ions from the sodium chloride solution and an aqueous salt solution containing magnesium chloride is formed. During feed of the sodium chloride solution, the composition of the displaced effluent liquor varies. When such feed is started, water or a very dilute salt solution flows from the bed, but as the feed is continued the concentration of magnesium ions in liquor flowing from the bed increases to a maximum value and may then decrease. The feed of the sodium chloride solution is usually continued until the concentration of sodium ions in liquor flowing from the bed increases. The portions of effluent liquor considerably richer in magnesium ions than is sea water are reserved as product liquor. The product liquor contains a higher atomic ratio of magnesium ions to sodium ions than sea water. The maximum concentration of magnesium ions in the regenerate liquor is dependent in part on the concentration of sodium chloride in the regenerating solution. For this reason an aqueous sodium chloride solution of 15 weight percent concentration or higher, and preferably a saturated sodium chloride solution, is usually employed in the regenerating operation.

After regenerating the cation exchange agent with the sodium chloride solution to produce the regenerate product liquor, the cation exchange agent is largely in the form of its sodium salt. It may be washed with water to flush any unconsumed sodium chloride solution therefrom and then be re-employed, or it may be re-employed directly from the absorption of magnesium ions from a further amount of sea water which may or may not be diluted with fresh water and may or may not have been depleted of calcium ions. After the cation exchange agent has thus been loaded with chemically absorbed magnesium ions it is treated with a portion of the above-mentioned product liquor diluted with, preferably an equal volume or more of, fresh water. This causes an increase in the amount of magnesium ions chemically absorbed by the cation exchange agent, i.e. it causes an increase in the atomic ratio of magnesium ions to sodium or other metal ions on said agent. A fairly concentrated sodium chloride solution may then be fed to the bed of cation exchange agent to regenerate the latter and produce a further amount of the product liquor. The product liquor obtained in this and subsequent cycles of the process using an aqueous sodium chloride solution of a given concentration as a regenerating liquor contains a higher maximum concentration of magnesium ions than the product liquor which is obtained by use of a similar sodium chloride solution in the first of the above-described regenerating operations of the process. A single bed of the cation exchange agent may repeatedly be employed, as just described, to produce successive batches of a product liquor which is far richer than sea water in magnesium chloride.

Instead of operating in the above batchwise manner, the process is advantageously carried out in continuous manner using an arrangement of apparatus such as that illustrated in Fig. 2 of the drawing. In employing such apparatus for the concentration of the magnesium salts of sea water, one or more of the columns 1, 2 and 3 are charged with a granular cation exchange agent, preferably with a sulfonated cation exchange resin in its sodium salt form. Sea water, or sea water which has been diluted with fresh water and/or has been depleted of calcium ions, is fed to column 1 through inlet 13. A fairly concentrated sodium chloride solution is fed to column 3 through inlet 14. The power-driven star valves 5, 8 and 11 are rotated and water is fed through the lines 6, 9 and 12 for purpose of conveying the cation exchange material from the bottom of each column to an upper section of another of the columns. The column 2 may initially be filled, or partially filled, with water. The water used in conveying the ion exchange material from one column to the next flows from the columns through the outlets 22, 23 and 24. Liquids fed to the columns 1 and 2 through the respective inlets 13 and 21 also flow from said columns through outlets 22 and 23. The cation exchange agent is thus circulated through columns 1, 2 and 3 counter to the flows of sea water and of the sodium chloride solution through the respective columns 1 and 3. This results in chemical absorption of magnesium ions from the sea water by the cation exchange material in column 1 and subsequent displacement of absorbed magnesium ions from said material by sodium ions of the sodium chloride solution in column 3. A regenerate liquor containing magnesium chloride is thus formed in column 3. This regenerate liquor flows from column 3 through line 15. The valve in line 16, which branches from the outlet line 15, is then opened to permit a portion of the regenerate liquor to flow into tank 18. Fresh water is preferably fed to tank 18 at a rate such as to dilute the regenerate liquor to a desired extent, e.g. with from 0.5 to 100 or more, usually from 5 to 80, times its volume of fresh water. In place of fresh water, sea water or a mixture of the same and fresh water can be used as the diluent. The diluted portion of the regenerate liquor is fed, by means of pump 20, into a lower section of column 2 and flows upward through the column counter to the descending ion exchange material. This results in an increase in the proportion of magnesium ions chemically absorbed by said material. It also results in an increase in the concentration of magnesium ions in the regenerate product liquor which is withdrawn from the system through outlet 15.

The relative rates of circulation of the cation exchange material through the series of columns and of feed of the above-mentioned liquids to the respective columns may be varied, but are preferably controlled as follows. The rate of feed of sea water, or diluted sea water, to column 1 is preferably such as to permit fall of the ion exchange material through the upward flowing liquid and such that a major proportion of the magnesium ions of the sea water are chemically absorbed by the cation exchange material. The relative rates of feed of cation exchange material and of the sodium chloride solution to column 3 are preferably such as to maintain the upper surface of a settled and fairly compact bed of ion material between the outlets 15 and 24 from the column and also are such as to maintain the interface between the water or other carrier material in the top section of said column and the more dense brine in lower portions of the column between said outlets 15 and 24 and somewhat above the upper surface of the bed of ion exchange material in the column. The proportion of the regenerate liquor from column 3 which is diluted as described above and is fed to column 2 is usually quite small, e.g. from 0.1 to 0.3 of the total amount of the regenerate liquor, the remainder of the latter being withdrawn as product. Larger proportions of the regenerate liquor can be diluted and recycled, if desired. The portion of regenerate liquor to be recycled is preferably diluted with from 5 to 80 times its volume of fresh water, but it may be diluted to as great an extent as desired. The diluted portion of the regenerate liquor is passed upward through column 2 at a rate permitting descent of the ion exchange material therethrough. The cation exchange material is preferably passed through column 2 at a rate such as to chemically absorb a major amount of the magnesium ions in the recycled portion of the regenerate liquor.

The method, as just described, permits recovery of the magnesium ions of seat water in the form of an aqueous salt solution, i.e. a regenerate product liquor, containing from 10 to 14 weight percent or more of magnesium chloride. The product liquor is sufficiently rich in magnesium chloride to permit economical separation of the latter in usual ways, e.g. by a combination of evaporation and crystallization operations.

The above-described continuous mode of practicing the invention can be modified by circulating the ion exchange agent through the series of columns in a manner such as to force, or raise, it through the individual columns while feeding the aforementioned liquors to upper sections of the respective columns and passing the liquors downward through the columns. Another way in which the continuous mode of operation may be modified is to circulate the ion exchange agent upward through certain of the columns and downward through one or more of the other columns. The feed liquor to each column is passed through the latter in a direction counter to the general movement of the ion exchange agent through the column.

The method can be applied in treating dilute aqueous solutions of other ionizable compounds, comprising monovalent and polyvalent cations or anions, to concentrate the polyvalent ions. For instance, a cation exchange resin can be employed in concentrating the calcium ions of a dilute aqueous solution of calcium chloride and sodium chloride, or of a dilute aqueous solution of calcium nitrate and potassium nitrate, or in concentrating the aluminum ions in a dilute aqueous solution of aluminum nitrate and nitric acid. In the first two of the instances just mentioned, fairly concentrated aqueous solutions of sodium chloride and of sodium nitrate may be employed as the respective regenerating agents and in the last instance a fairly concentrated aqueous nitric acid solution may be used as the regenerating agent.

By employing an anion exchange agent, particularly a strongly basic anion exchange agent, or a salt thereof, the process can be applied in treating dilute aqueous solutions of compounds comprising monovalent and polyvalent anions to concentrate the polyvalent anions. For instance, it can be applied in treating such a solution comprising sulfate and chloride ions to concentrate the sulfate ions, or in treating such a solution comprising phosphate and nitrate ions to concentrate the phosphate ions. In such instances, a fairly concentrated solution of a salt or a base containing a monovalent ion corresponding to that present in the starting solution is advantageously used as a regenerating agent and a portion of the regenerate liquor which is richer in the polyvalent anion than the starting solution is diluted, preferably with fresh water, and recycled into contact with the anion exchange agent after the latter has chemically absorbed anions from the starting solution. A variety of anion exchange agents are known. The strongly basic anion exchange resins containing quaternary ammonium radicals, e.g. those obtained by reacting tertiary amines such as trimethylamine or dimethylethanolamine with a solid chloromethylated copolymer of styrene, ethylvinylbenzene and divinylbenzene, are preferably employed in concentrating the polyvalent anions in a dilute aqueous solution thereof by the method of the invention.

Except for the kinds of starting solutions, ion exchange agents, and regenerating agents employed, the procedures in treating all of the above-mentioned starting solutions to concentrate the polyvalent cations or anions thereof are similar to those hereinbefore described with regard to the concentration of the magnesium ions of sea water.

The following examples describe ways in which the invention has been practiced, but are not to be construed as limiting its scope.

EXAMPLE 1

An aqueous starting solution of sodium chloride in 0.605 normal concentration and calcium chloride in 0.05 normal concentration was fed to a 100 ml. bed of a cation exchange resin in a manner such that the liquid flowed through the bed. The cation exchange resin was a sulfonated copolymer of a major amount by weight of styrene and minor amounts of ethylvinylbenzene and divinylbenzene. It was a granular material of from 20 to 50 Tyler screen mesh sizes and was initially in the form of its sodium salt. The above-mentioned solution was fed to the bed until the ion exchange resin had chemically absorbed its capacity of calcium ions from the solution, i.e. until the sodium and calcium ions of the resin were approximately at the point of equilibrium with the sodium and calcium ions in the solution. From the known ion absorptive capacity of the resin and the measured amount of calcium chemically absorbed by the resin from the solution, it was calculated that about 39 percent of the total ion absorptive capacity of the thus-treated resin was satisfied by absorbed calcium ions and the remainder by sodium ions, i.e. the ratio of chemical equivalents of sodium ions to chemical equivalents of calcium ions in the resin was then approximately 1.565. An aqueous sodium chloride solution of 4 normal concentration was fed to the bed of the thus-treated resin and the effluent liquor from the bed was collected in successive portions which were analyzed to determine the concentrations of sodium and calcium ions therein. The following table identifies a number of these successive portions of effluent liquor and gives the concentration, in milliequivalents per milliliter, of sodium and calcium ions in each such portion.

Table I

| Effluent liquor portion, ml. | Meq./ml. of— | |
|---|---|---|
| | Na ions | Ca ions |
| 0–25 | 0.6 | 0.05 |
| 25–40 | 0.7 | 0.07 |
| 40–48 | 1.25 | 0.22 |
| 48–55 | 1.84 | 0.42 |
| 55–63 | 2.30 | 0.62 |
| 63–70 | 2.72 | 0.75 |
| 70–78 | 3.02 | 0.77 |
| 78–85 | 3.22 | 0.72 |
| 85–115 | 3.55 | 0.45 |

The concentration of sodium ions continued to rise and the concentration of calcium ions continued to decrease in the further successive portions of the effluent liquor until the liquor flowing from the bed corresponded in composition to the 4 normal sodium chloride solution being fed to the bed. It will be noted in the above table that the maximum concentration of calcium ions in the effluent liquor was 0.77 meq./ml. and that this portion of the liquor richest in calcium ions contained approximately 3.9 chemical equivalents of sodium ions per chemical equivalent of calcium ions. It is estimated that the 55–115 ml. portions of the effluent liquor described above contain an average of about 5.5 chemical equivalents of sodium ions per chemical equivalent of calcium ions. An aqueous solution of sodium chloride and calcium chloride in these relative proportions was prepared and brought to a dilution such that it contained a total of 0.65 chemical equivalent of sodium and calcium ions per liter. This solution (which is approximately the same as would be obtained by diluting the 55–115 ml. fraction of the above-described effluent liquor to a corresponding extent) was fed to the bed of ion exchange resin in amount sufficient to saturate the bed with ions chemically absorbed therefrom. This step corresponds to employment of a water-diluted portion of the above effluent liquor for further treatment of the bed after it had absorbed its capacity of calcium ions from the starting solution initially employed in this experiment. It was found that this step resulted in chemical absorption of calcium ions, by the resin, in amount such that approximately 58 percent of the total ion absorptive capacity of the resin was then satisfied by calcium ions, the remainder being satisfied by sodium ions, i.e. the resin then contained only about 0.72 equivalent of sodium ions per chemical equivalent of calcium ions. The bed of resin was again eluted with an aqueous 4 normal sodium chloride solution and the resulting effluent liquor was collected in small successive portions, each of which was analyzed to determine the concentrations of sodium ions and calcium ions therein. Table II identifies a number of these portions of the effluent liquor and gives the concentrations, in meq./ml., of sodium and calcium ions therein.

*Table II*

| Effluent liquor portion, ml. | Meq./ml. of— | |
|---|---|---|
| | Na ions | Ca ions |
| 0–26 | 0.55 | 0.10 |
| 26–35 | 0.60 | 0.11 |
| 35–48 | 1.05 | 0.37 |
| 48–60 | 1.76 | 0.90 |
| 60–72 | 2.42 | 1.08 |
| 72–83 | 2.85 | 1.00 |
| 83–93 | 3.10 | 0.88 |
| 93–103 | 3.28 | 0.72 |
| 103–113 | 3.43 | 0.58 |

The concentration of sodium ions continued to increase, and that of calcium ions continued to decrease, in further successive portions of the effluent liquor until the liquor flowing from the bed was of approximately the same composition as the aqueous 4 normal sodium chloride solution being fed to the bed. In Table II the maximum concentration of calcium ions in the effluent liquor is 1.08 meq./ml. and the portion of the liquor having this maximum concentration of calcium ions contained only about 2.24 equivalents of sodium ions per chemical equivalent of calcium ions, i.e. the maximum concentration of calcium ions is much higher, and the ratio of sodium ions to calcium ions in this portion of the effluent liquor is lower, in Table II than in Table I. It is evident, from these results, that the feature in the invention, of diluting with water a portion of the regenerate liquor rich in polyvalent ions and using the diluted regenerate liquor to treat ion exchange material that has been contacted with the starting solution is advantageous in the respects just stated, i.e. in causing an increase in maximum concentration of polyvalent ions in the final regenerate liquor obtained by thereafter treating the ion exchange material with a regenerating agent and a decrease in the ratio of monovalent to polyvalent ions in the portion of the regenerate liquor richest in the polyvalent ions.

EXAMPLE 2

This example illustrates application of the method of the invention in concentrating the polyvalent anions initially present in a dilute aqueous salt solution containing monovalent and polyvalent anions. The starting solution was an aqueous solution of sodium chloride in 0.09 normal concentration and of sodium sulfate in 0.01 normal concentration. A 100 ml. bed of an anion exchange resin, in the form of granules of from 20 to 50 Tyler screen mesh sizes, was employed in the experiment. The anion exchange agent was, initially, the chloride salt of a strongly basic anion exchange resin which had been formed by reacting trimethylamine with a chloromethylated copolymer of a major amount by weight of styrene and minor amounts of ethylvinylbenzene and divinylbenzene. The starting solution was fed to the water-immersed bed of anion exchange resin, and caused to flow through the bed, until the liquor flowing from the bed was of approximately the same composition as the starting solution. About 18 percent of the resin was thereby converted to its sulfate form, the remainder being the chloride form of the resin, i.e. the thus-treated resin contained about 4.6 equivalents of chloride ions per chemical equivalent of sulfate ions. The bed was washed with water and then eluted with an aqueous 2 normal sodium chloride solution. The resulting effluent liquor was collected in successive small portions, each of which was analyzed to determine the concentrations of chloride and sulfate ions therein. Table III identifies a number of these portions of the effluent liquor and gives the concentrations, in meq./ml. of chloride and sulfate ions in each portion.

*Table III*

| Effluent liquor portion, ml. | Meq./ml. of— | |
|---|---|---|
| | Cl ions | SO$_4$ ions |
| 0–36 | 0 | 0 |
| 36–40 | 0.12 | 0.06 |
| 40–49 | 0.37 | 0.47 |
| 49–58 | 0.51 | 0.80 |
| 58–67 | 1.15 | 0.45 |
| 67–77 | 1.75 | 0.12 |

The portion of the effluent liquor richest in sulfate ions, i.e. containing 0.8 meq./ml. of sulfate ions, contained approximately 0.64 equivalent of chloride ions per chemical equivalent of the sulfate ions. An aqueous solution of sodium chloride and sodium sulfate, having the relative proportions of chloride to sulfate ions just stated, was prepared and brought to a dilution such that it contained a total of 0.1 gram equivalent weight of chloride and sulfate ions per liter. Except for being prepared in larger amount, this solution is substantially identical with that obtainable by diluting a 55–65 ml. portion of the above effluent liquor to a corresponding extent with water. It was fed to the bed of anion exchange resin until the liquor flowing from the bed was of about the same composition as that being fed. About 80 percent of the resin was thereby converted to its sulfate form and about 20 percent remained as the resin chloride. The bed of ion exchange material was washed with water and then eluted with an aqueous 2 normal sodium chloride solution. The resulting effluent liquor was collected in successive portions and each portion was analyzed to determine the concentrations of chloride and sulfate ions therein. Table IV identifies a number of these portions of the effluent liquor and gives the concentrations, in meq./ml. of chloride and sulfate ions therein.

Table IV

| Effluent liquor portion, ml. | Meq./ml. of— | |
|---|---|---|
| | Cl ions | SO₄ ions |
| 0–34 | 0 | 0 |
| 34–39 | 0.03 | 0.12 |
| 39–49 | 0.08 | 0.68 |
| 49–59 | 0.10 | 1.36 |
| 59–68 | 0.10 | 1.56 |
| 68–77 | 0.10 | 1.62 |
| 77–87 | 0.25 | 1.50 |
| 87–96 | 0.88 | 0.92 |
| 96–106 | 1.72 | 0.23 |
| 106–116 | 1.93 | 0.05 |
| 116–125 | 1.98 | 0.02 |

EXAMPLE 3

An aqueous starting solution of hydrochloric acid and calcium chloride in 0.397 normal and 0.0362 normal concentrations, respectively, was fed to a 100 ml. bed of a cation exchange resin, similar to that used in Example 1, until the liquor flowing from the bed was of approximately the same composition as the feed liquor. An aqueous hydrochloric acid solution of about 36 weight percent concentration was then fed to the bed and the resulting effluent liquor was collected in successive portions, each of which was analyzed to determine the concentrations of calcium ions and hydrogen ions therein. The concentration of calcium ions increased to a maximum 14,010 p.p.m. and then decreased in the successive portions of the effluent liquor. A number of the successive effluent liquor fractions, richest in calcium ions, were combined to obtain an initial acidic product liquor which was an aqueous solution of calcium chloride in 0.615 normal concentration and hydrochloric acid in 5.33 normal concentration. Further amounts of the above-mentioned starting solution were fed to the bed of ion exchange material until the latter was saturated with ions chemically absorbed from the starting solution. A portion of the above-mentioned initial product liquor was diluted with ten times its volume of fresh water and the resulting solution was fed to the bed of ion exchange material that had been treated with the starting solution. The introduction of the diluted initial product liquor to the bed was continued until the liquor flowing from the bed was of approximately the same compositions as that being fed to the bed. The bed was then eluted with an aqueous 36 weight percent hydrochloric acid solution and the resulting effluent liquor was collected in successive portions which were analyzed. The concentration of calcium ions increased to a maximum value of 21,800 p.p.m., and then decreased in the successive portions of this effluent liquor. A number of the successive effluent liquor portions, richest in calcium ions, were combined and constituted a final product liquor. This final product liquor was an aqueous solution of calcium chloride in 0.697 normal concentration and hydrochloric acid in 3.86 normal concentration.

EXAMPLE 4

An arrangement of apparatus similar to that illustrated in Fig. 2 of the drawing was used to concentrate the magnesium ions of sea water in a continuous manner. Column 1 of the apparatus was of 14 inches internal diameter and each of the columns 2 and 3 were of 4 inches internal diameter. The apparatus was charged with a granular cation exchange agent consisting of the sodium salt of a sulfonated copolymer of styrene and minor amounts of ethylvinylbenzene and divinylbenzene. Sea water, that had been pretreated with sodium carbonate to remove dissolved calcium ions by formation of a precipitate of calcium carbonate and had been diluted with fresh water, was fed to column 1 through inlet 13 at a rate of 2.84 liters per minute. This feed liquor of pretreated sea water was found by analysis to contain approximately 570 p.p.m. of magnesium ions, 37 p.p.m. of dissolved calcium ions, 5000 p.p.m. of sodium ions and 8500 of chloride ions. The star valves 5, 8 and 11 were operated and water was fed through lines 6, 9 and 12 to cause circulation of the ion exchange resin through columns 1—3. The carrier water for conveying the ion exchange material from one column to the next flowed from the columns 1—3 through the respective outlets 22, 23 and 24. The ion exchange resin was thus caused to circulate at a rate of about 95 cc. bed volume of the resin per minute. At the same time, an aqueous sodium chloride solution, which analyzed as containing about 835 p.p.m. of dissolved calcium ions, 106,000 p.p.m. of sodium ions, and 164,000 p.p.m. of chloride ions, was fed at a rate of 164 cc. per minute to column 3 through inlet 14. The resulting regenerate liquor flowed from column 3 through line 15. A portion of the regenerate liquor was withdrawn at a rate of 23 cc. per minute as the product liquor from the process. The remainder of the regenerate liquor flowed from line 15 through line 16 to the dilution chamber 18 at a rate of 9 cc. per minute while feeding water into chamber 18 through line 17 at a rate of 455 cc. per minute. The thus-diluted portion of the regenerate liquor was passed from chamber 18 through line 19, pump 20 and line 21 into column 2. It served as reflux liquor for contact with the ion exchange material in column 2. The spent reflux liquor overflowed from column 2 through outlet 23. During operation in the continuous manner just described, portions of the ion exchange resin were withdrawn from the bottoms of the columns 1 and 2, respectively, and were analyzed to determine the proportions of magnesium chemically absorbed therein. The dried ion exchange resin from column 1 contained 2.68 weight percent of magnesium and the dried resin from column 2 contained 3.54 weight percent of magnesium. The product liquor, being discharged through line 15 from the process, contained 14.1 percent by weight of magnesium chloride.

EXAMPLE 5

Two further experiments were carried out as described in Example 4, except that in each of these further experiments, hereinafter referred to as experiments (a) and (b), respectively, the ion exchange resin was circulated at a bed volumn rate of 122 cc. per minute, the aqueous sodium chloride solution was fed through inlet 14 to column 3 at a rate of 147 cc. per minute and the reflux ratios and extent of dilution with fresh water of the portion of the regenerate liquor recycled as reflux material were as follows. In experiment (a) 3.3 parts by volume of the regenerate liquor was diluted with 61 times its volume of fresh water and recycled as reflux material per part of the regenerate liquor which was withdrawn from the system through line 15 as the product, i.e. the reflux ratio was 3.3/1. In experiment (b) the reflux ratio was 1/1 and the portion of the regenerate liquor to be recycled was diluted with 79 times its volume of fresh water and then employed as reflux material. In each experiment, the proportions of magnesium in the resin at the bottom of each of the columns 1 and 2 was determined, as in Example 4. In experiment (a), the portions of resin from columns 1 and 2 contained, on a dry basis, 2.33 and 2.81 weight percent of magnesium, respectively. In experiment (b), the portions of resin from columns 1 and 2 contained, on a dry resin basis, 2.22 and 2.82 weight percent of magnesium, respectively. The product liquor obtained in experiment (a) contained 12.25 percent by weight of magnesium chloride and the product liquor obtained in experiment (b) contained 11.1 percent of magnesium chloride.

EXAMPLE 6

Another experiment was carried out in a manner similar to that described in Example 4, except that the sea water which was fed to the system had been diluted with an approximately equal volume of fresh water, but was not otherwise pretreated; the diluted sea water was fed to the system at a rate of 2.91 liters per minute; the rate of circulation of the ion exchange resin was 98 cc. of bed volume of resin per minute; the rate of feed of the aqueous sodium chloride solution through inlet 14 to column 3 was 92 cc. per minute, and the reflux ratio, extent of dilution of the portion of the regenerate liquor employed for reflux and the concentration of the product liquor were as follows. The reflux ratio was 1.25/1. The portion of the regenerate liquor employed for reflux was diluted with 37.5 times its volume of fresh water to form the reflux liquor. Portions of the ion exchange resin withdrawn as samples from the bottoms of columns 1 and 2 during operation of the process contained, on a dry resin basis, 2.15 and 2.43 weight percent of magnesium, respectively. The product liquor from the process contained 11.25 weight percent of magnesium chloride.

EXAMPLE 7

An experiment was carried out in a manner similar to that described in Example 6, except that the rate of circulation of the ion exchange resin was 122 cc. of bed volume of the resin per minute; the rate of feed of the aqueous sodium chloride solution through inlet 14 to column 3 was 100 cc. per minute; the reflux ratio was 1/1.4; the portion of the regenerate liquor employed for reflux was diluted with 77 times its volume of sea water (instead of fresh water) to form the reflux liquor and the reflux liquor thus formed was treated with sodium carbonate to remove calcium ions therefrom as a precipitate of calcium carbonate before being fed into contact with the ion exchange resin in column 2. During operation of the process, samples of ion exchange resin were withdrawn from the lower ends of columns 1 and 2 and were analyzed. The portions of ion exchange resin from columns 1 and 2 contained, on a dry basis, 2.10 and 2.32 weight percent of magnesium, respectively. This difference in magnesium content is due to the recycling of part of the regenerate liquor in diluted form as reflux material.

We claim:

1. In a method of treating an aqueous starting solution of monovalent and polyvalent ions having the same kind of electrical charge to concentrate the polyvalent ions wherein the starting solution is (1) contacted with an ion exchange agent effective in chemically absorbing the polyvalent ions and the ion exchange agent is (3) thereafter contacted with a regenerating agent containing a higher concentration of monovalent ions, having said kind of electrical charge, than the starting solution, whereby a regenerate liquor richer in the polyvalent ions than the starting solution is formed, the combination of the steps (1) and (3), just-mentioned, together with an intervening step of (2) treating the ion exchange agent, which has been contacted with the starting solution and which is loaded with ions chemically absorbed from the starting solution, with an aqueous liquor having a composition corresponding approximately to that of a liquor obtainable by diluting a portion of said regenerate liquor with at least an equal volume of an aqueous liquid selected from the group consisting of water, a portion of said starting solution, and mixtures of water and the starting solution.

2. In a method of treating dilute aqueous starting solutions of ionizable compounds, which starting solutions contain monovalent and polyvalent ions having the same kind of electrical charge, to concentrate the polyvalent ions, wherein such a starting solution (a) is contacted with an ion exchange agent effective in chemically absorbing the polyvalent ions and (b) the ion exchange agent is thereafter contacted with an aqueous regenerating solution containing a higher concentration of said monovalent ions than the starting solution, whereby the polyvalent ions are displaced from the ion exchange agent to form a regenerate liquor comprising the polyvalent ions in a concentration higher than in the starting solution, the steps of (1) collecting such regenerate liquor containing the polyvalent ions in a concentration higher than in the starting solution, (2) diluting a portion of this regenerate liquor with at least an equal volume of an aqueous liquid selected from the group consisting of water, a portion of the starting solution, and mixtures of water and starting solution, (3) contacting the ion exchange agent with a portion of the starting solution to cause chemical absorption of polyvalent ions from the starting solution by the ion exchange agent, (4) contacting the thus-treated ion exchange agent with the diluted portion of the regenerate liquor to cause said agent to chemically absorb a further amount of the polyvalent ions from the liquor, and (5) thereafter contacting the ion exchange agent with an aqueous regenerating solution containing a higher concentration of said monovalent ions than the starting solution, whereby polyvalent ions are displaced from the ion exchange agent with formation of a regenerate liquor containing a higher concentration of the polyvalent ions than is obtainable by practice of the above-mentioned operations (a) and (b) only with employment of the same kind, concentration and amount of regenerating solution in the operation (b).

3. A method of treating dilute aqueous starting solutions of ionizable compounds, which starting solutions contain monovalent and polyvalent ions having the same kind of electrical charge, to concentrate the polyvalent ions, comprising (1) contacting such a starting solution with an ion exchange agent effective in chemically absorbing the polyvalent ions, (2) contacting the thus-treated ion exchange agent with an aqueous liquor having a composition corresponding approximately to that of the diluted portion of regenerate liquor obtained in the fifth of the steps herein stated, (3) thereafter contacting the ion exchange agent with an aqueous regenerating solution containing a higher molar concentration of monovalent ions having the above-mentioned electrical charge than the starting solution, whereby polyvalent ions are displaced from the ion exchange agent with formation of a regenerate liquor which is richer than the starting solution in the polyvalent ions, (4) collecting such regenerate liquor containing the polyvalent ions in a concentration higher than in the starting solution, and (5) diluting a portion of this regenerate liquor with at least an equal volume of an aqueous liquid selected from the group consisting of water, a portion of the starting solution, and mixtures of water and starting solution whereby there is obtained an aqueous liquor suitable for use in the second of the above-stated steps of the process.

4. A method, as claimed in claim 3, wherein the concentration of the polyvalent ions is accomplished in a continuous manner by circulating the ion exchange agent consecutively through a first reaction zone, a second reaction zone, and a third reaction zone while feeding the starting solution to an end section of the first zone and causing it to flow in a direction counter to the movement of the ion exchange agent through the first zone, feeding the regenerating liquor to an end section of the third zone and causing it to flow in a direction counter to the movement of the ion exchange agent through the third zone whereby a regenerate liquor, richer in the polyvalent ions than the starting solution, is formed within the third zone, withdrawing said regenerate liquor from the third zone at a point remote from that at which the regenerating liquor is fed to the third zone, diluting a portion of the regenerate liquor with an aqueous liquor selected from the group consisting of water, a portion of the starting solution, and mixtures of water and starting solution, feeding the diluted liquor into an end section of the second zone and causing it to flow in a direction counter to the movement of the ion exchange agent through the second zone, and withdrawing the remaining portion of said regenerate liquor as a product from the system.

5. A method, as claimed in claim 3, wherein the concentration of the polyvalent ions is accomplished in a continuous manner by circulating the ion exchange agent in granular form through a series of at least three columns while feeding the starting solution to an end section of one of the columns and causing it to flow through the column in a direction counter to the movement of the ion exchange agent through the column, feeding the regenerating liquor to an end section of another of the columns and causing it to flow in the column in a direction counter to the movement of the ion exchange agent through the column whereby a regenerate liquor, richer in the polyvalent ions than the starting solution, is formed within the column, withdrawing said regenerate liquor from the last-mentioned column at a point remote from that at which the regenerating liquor is fed to the column, diluting a portion of the regenerate liquor with water, feeding the diluted liquor into an end section of another column and causing it to flow through the column in a direction counter to the movement of the ion exchange agent through the column, and withdrawing the remaining portion of said regenerate liquor as a product from the system.

6. A method, as claimed in claim 5, wherein the starting solution contains monovalent and polyvalent cations, the ion exchange agent is a cation exchange agent, and the regenerating liquor is an aqueous solution containing monovalent cations of the kind present in the starting solution.

7. A method, as claimed in claim 5, wherein the starting solution is an aqueous solution comprising the magnesium and sodium salts of sea water in concentrations not greater than in sea water, the ion exchange agent is a cation exchange agent, and the regenerating liquor is an aqueous solution of sodium chloride in a concentration at least as high as 10 percent by weight.

8. A method, as claimed in claim 5, wherein the starting solution comprises sea water which has been depleted of calcium ions, the ion exchange agent is a cation exchange resin containing sulfonate groups in the molecule, the regenerating liquor is an aqueous sodium chloride solution of at least 15 weight percent concentration, and the regenerate product liquor is an aqueous salt solution which is richer in magnesium chloride than sea water.

9. A method, as claimed in claim 5, wherein the starting solution contains monovalent and polyvalent anions, the ion exchange agent is an anion exchange agent, and the regenerating liquor is an aqueous solution rich in monovalent anions.

References Cited in the file of this patent

UNITED STATES PATENTS

| | | |
|---|---|---|
| 2,387,898 | Grebe et al. | Oct. 30, 1945 |
| 2,671,714 | McIlhenny et al. | Mar. 9, 1954 |

OTHER REFERENCES

"Ion Exchange Resins," book by Kunin and Myers, 1950 ed., page 25, John Wiley & Sons, Inc., New York.

J. W. Mellor's "A Comprehensive Treatise on Inorganic and Theoretical Chemistry," volume 2, 1922 ed., page 523. Longmans, Green & Co., New York.

"Ion Exchange, Theory and Application," book by F. C. Nachod, page 8, Academic Press Inc., New York (1949).